(12) United States Patent
David et al.

(10) Patent No.: US 10,101,774 B2
(45) Date of Patent: Oct. 16, 2018

(54) MECHANICAL ACTUATION OF RETRACTABLE KEYBOARD

(71) Applicant: Dell Products, L.P., Round Rock, TX (US)

(72) Inventors: Michael David, Austin, TX (US); Ernesto Ramirez, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/449,864

(22) Filed: Mar. 3, 2017

(65) Prior Publication Data
US 2018/0253124 A1    Sep. 6, 2018

(51) Int. Cl.
*G06F 1/16* (2006.01)

(52) U.S. Cl.
CPC .......... *G06F 1/1666* (2013.01); *G06F 1/1618* (2013.01); *G06F 1/1643* (2013.01); *G06F 1/1664* (2013.01)

(58) Field of Classification Search
CPC .... G06F 1/1664; G06F 1/1666; G06F 1/1618; G06F 1/1643
USPC .................................................. 361/679.13
See application file for complete search history.

(56) References Cited

U.S. PATENT DOCUMENTS

| | | | | |
|---|---|---|---|---|
| 5,635,928 A * | 6/1997 | Takagi | ................... | G06F 1/1616 341/22 |
| 5,768,094 A * | 6/1998 | Merkel | ................ | G06F 1/1616 361/679.11 |
| 5,790,370 A * | 8/1998 | Merkel | ................. | G06F 1/1666 361/679.08 |
| 5,874,696 A * | 2/1999 | Hayashi | ................ | G06F 1/1616 200/345 |
| 6,087,966 A * | 7/2000 | Sato | ........................ | G06F 3/023 200/345 |
| 6,297,461 B1 * | 10/2001 | Kamishima | ........... | G06F 1/1616 200/344 |
| 6,529,370 B1 * | 3/2003 | Kamishima | ........... | G06F 1/1616 200/5 A |
| 6,590,565 B2 * | 7/2003 | Hosoya | ................. | G06F 1/1616 345/168 |
| 9,213,372 B2 * | 12/2015 | Krumpelman | ......... | H01H 13/14 |
| 9,632,530 B2 * | 4/2017 | Jacobs | ................... | G06F 1/1662 |
| 9,778,683 B2 * | 10/2017 | Ho | ........................ | G06F 1/1618 |

(Continued)

FOREIGN PATENT DOCUMENTS

JP    2016212722 A   * 12/2016   ........... G06F 1/1616

*Primary Examiner* — Nidhi Thaker
(74) *Attorney, Agent, or Firm* — Fogarty LLP

(57) ABSTRACT

Embodiments provide mechanisms for actuating the retraction of the keys of a retractable keyboard based on the angle of the rotation of a coupled display, such as in a 2-in-1 IHS (Information Handling System) that may be operated as a tablet or a laptop. In a first mode, where the display of the IHS is in a laptop configuration, the provided mechanisms actuate the retractable keys to their extended positions allowing use of the IHS as a laptop. As the user rotates the display to various tablet configurations, the provided mechanisms actuate the keycaps to a second mode, in which the keycaps are retracted and may be further disabled to promote use of IHS as a tablet. Certain embodiments utilize a gear and cam mechanism to link the rotation of the display to the actuation of the keycaps. Certain other embodiments utilize a gear and crank mechanism.

15 Claims, 9 Drawing Sheets

(56) References Cited

U.S. PATENT DOCUMENTS 9,829,928 B2 * 11/2017 Chiu .................... G06F 1/1669
2014/0183019 A1 * 7/2014 Misawa ................ G06F 1/1616
200/5 A

* cited by examiner

MECHANICAL ACTUATION OF RETRACTABLE KEYBOARD

FIELD

This disclosure relates generally to retractable keyboard devices, and more specifically, to the actuation of the retractable keys of a keyboard device that may be utilized by a mobile Information Handling System (IHS).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Touchscreen operated tablet devices have become a common type of IHS such that touchscreen devices are now used in a wide variety of settings. However, many applications are still best utilized with at least some amount of keyboard user input. Accordingly, "2-in-1" IHSs that can be used as both a laptop and a tablet have become increasingly popular. A 2-in-1 IHS includes a touchscreen display that is coupled to a keyboard. The touchscreen and the keyboard may be permanently coupled via mechanical and electrical connections. In some 2-in-1 IHSs, the touchscreen display and the keyboard may be separable and thus connected via a temporary coupling (such as a magnetic coupling) and the touchscreen display and that keyboard interoperate via a wireless connection. In certain 2-in-1 devices, the touchscreen display and the keyboard may be rotated about the coupling that joins these two components. Based the rotation of the touchscreen display and the keyboard about this coupling, the 2-in-1 IHS may be used as either a tablet device, a traditional laptop, or a hybrid of the two.

One features included in certain 2-in-1 IHSs is a keyboard with retractable keys. In one configuration, the key caps of such retractable keyboards are extended and operable by the user. In another configuration of a retractable keyboard, the key caps are retracted such that they are in a lowered position, thus serving to disable the keys at least to a certain respect. In certain scenarios, retractable keyboards may be configured to further disable the retracted key caps. Disabling the key caps allows the touchscreen display to be used as a tablet without the possibility of accidental keyboard inputs. In certain retractable keyboards, in addition to disabling inputs from the keys, retracting the keys also temporarily locks the keys in a fixed position such that the user does not hear or feel the actuation or other movement of the keys while using the touchscreen display as a tablet device. In addition, lowering the key caps into retracted positions serves to reduce the thickness of the system.

SUMMARY

Certain described embodiments provide an IHS (Information Handling System) including a keyboard device comprising a plurality of retractable key caps. In a first mode, the plurality of retractable key caps are in extended positions. In a second mode, the plurality of retractable key caps are in retracted positions. The IHS further includes a display device coupled to the keyboard device, wherein the coupling allows the display device to be rotated relative to the keyboard device, and wherein the keyboard device is configured to switch from the first mode to the second mode based on the rotation of the coupling.

In certain additional embodiments of the IHS, the display device and the keyboard device are coupled via one or more hinges. In certain additional embodiments of the IHS, rotating of the one or more hinges causes a gear mechanism to switch the keyboard device from the first mode to the second mode. In certain additional embodiments of the IHS, the keyboard device is switched from a first mode to the second mode via the displacement of a keyboard support plate. In certain additional embodiments of the IHS, the gear mechanism drives a cam that exerts a displacement force on the keyboard support plate. In certain additional embodiments of the IHS, the cam exerts the displacement force on the keyboard support plate by displacing a force on a follower coupled do the keyboard support plate. In certain additional embodiments of the IHS, the gear mechanism drives a crank that exerts a displacement force on the keyboard support plate. In certain additional embodiments of the IHS, the crank exerts the displacement force on the keyboard support plate by displacing a force on a pin used to couple the keyboard support plate to the crank. In certain additional embodiments of the IHS, the movement of the pin is restricted by a channel.

Certain described embodiments provide a keyboard device including a plurality of retractable key caps. In a first mode, the plurality of retractable key caps are in extended positions. In a second mode, the plurality of retractable key caps are in retracted positions. The keyboard device further includes a coupling to a display device, wherein the coupling allows the display device to be rotated relative to the keyboard device, and wherein the keyboard device is configured to switch from the first mode to the second mode based on the rotation of the coupling.

In certain additional embodiments of the keyboard device, the coupling comprises one or more hinges connecting the display device and the keyboard device. Certain additional embodiments of the keyboard device further include a gear mechanism configured to translate the rotation of the coupling to a force that causes the keyboard device to switch from the first mode to the second mode. Certain additional embodiments of the keyboard device further include a keyboard support plate, wherein the keyboard device is configured to switch from a first mode to the second mode via a displacement the force generated by the gear mechanism on the keyboard support plate. In certain additional embodiments of the keyboard device, the gear mechanism drives a cam that exerts the displacement force on the keyboard support plate. In certain additional embodiments of the keyboard device, the cam exerts the displacement force on the keyboard support plate by displacing a force on a follower coupled do the keyboard support plate. In certain additional embodiments of the keyboard device, the gear mechanism drives a crank that exerts the displacement force on the keyboard support plate. In certain additional embodiments of the keyboard device, the crank exerts the displacement force on the keyboard support plate by displacing a force on a pin used to couple the keyboard support plate to the crank. In certain additional embodiments of the keyboard device, the movement of the pin is restricted by a channel.

Certain described embodiments provide a method for driving a plurality retractable key caps comprising a retractable keyboard device coupled to a display device via a coupling that allows the display device to be rotated relative to the keyboard device. The method includes translating the rotation of the coupling to a force that switches the plurality of retractable keys from a first mode to a second mode, wherein in the first mode, the plurality of retractable key caps are in extended positions, and in the second mode, the plurality of retractable key caps are in retracted positions. In certain additional embodiments of the method, the translation utilizes a gear mechanism that transfers the force to a displacement of a keyboard support plate located below the retractable key caps, wherein the displacement switches the retractable keys from the first mode to the second mode.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 1:
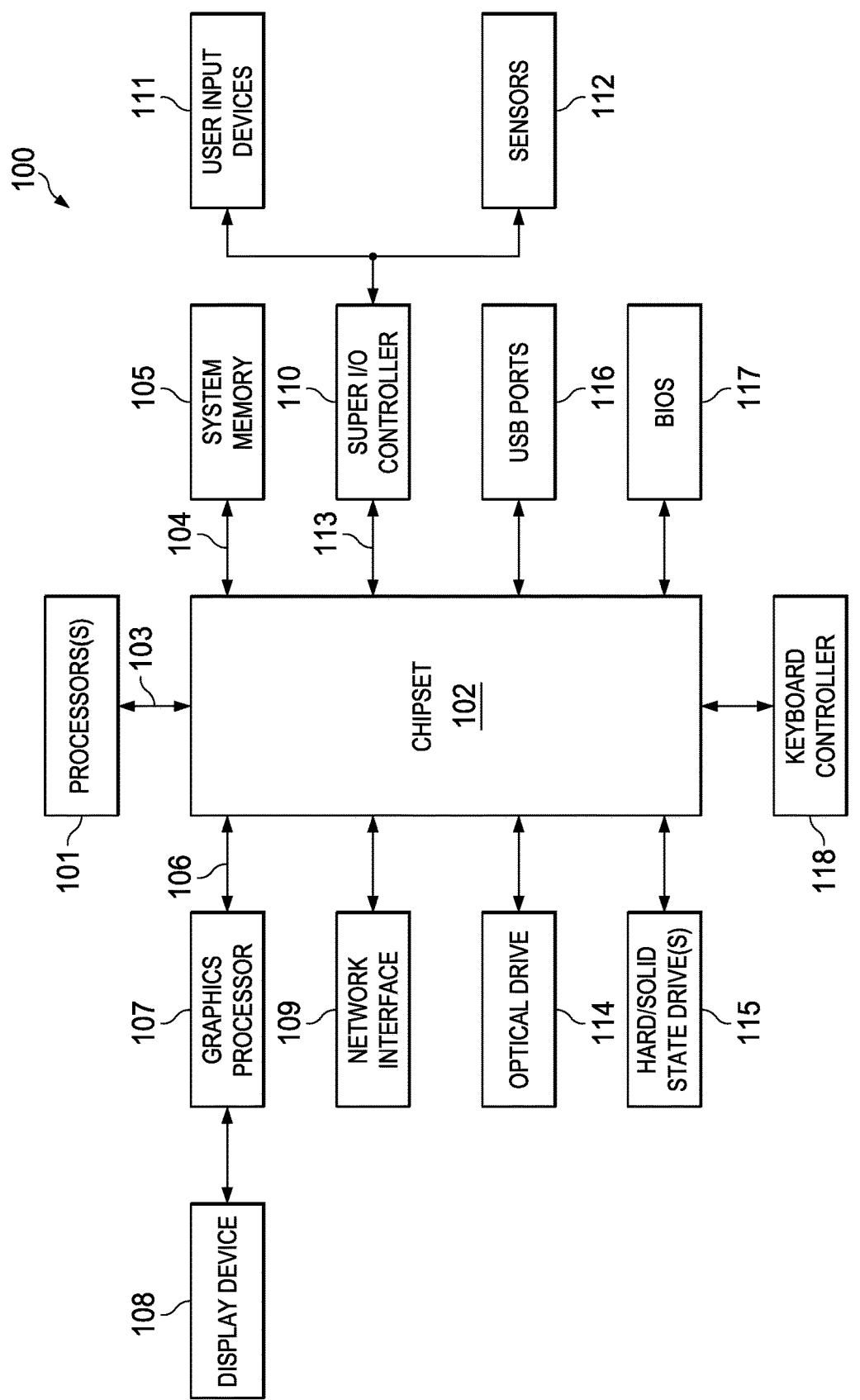
FIG. 1 is a block diagram depicting certain components of an IHS configured according to various embodiments for use with a retractable keyboard.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows various internal components of an example IHS configured to implement the provided embodiments. It should be appreciated that although certain embodiments described herein may be discussed in the context of a "2-in-1" IHS that can be configured by the user as a traditional laptop computer or a tablet, other embodiments may be utilized with various other types of IHSs that include a retractable keyboard coupled to a display device.

FIG. 1 is a block diagram of an IHS 100 configured according to certain embodiments to provide a mechanically actuated retractable keyboard device according to various embodiments. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a chipset 102 that may include one or more integrated circuits that are connect to processor(s) 101. In certain embodiments, the chipset 102 may utilize a QPI (QuickPath Interconnect) bus 103 for communicating with the processor(s) 101. Chipset 102 provides the processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Chipset 102 may also provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus, a PCIe (Peripheral Component Interconnect Express) bus. In certain embodiments, a graphics processor 107 generates display signals and provides them to a display device 108. In certain embodiments, the display device 108 may be a touch-sensitive display that may be used both as a conventional laptop display and as a tablet touchscreen. In certain embodiments, the display device 108 may be configured to provide different display and touchscreen functionality depending on the configuration of the IHS 100 as either a laptop or a tablet.

In certain embodiments, chipset 102 may also provide access to one or more user input devices 111. In such embodiments, chipset 102 may be coupled to a super I/O controller 110 that provides interfaces for a variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communications with one or more sensor devices 112, which may include environment sensors, such as a temperature sensor or other cooling system sensors. The I/O devices, such as the user input devices 111 and the sensor devices 112, may interface super I/O controller 110 through wired or wireless connections. In certain embodiments, the super I/O controller 110 may be coupled to the super I/O controller 110 via a Low Pin Count (LPC) bus 113.

Other resources may also be coupled to the processor(s) 101 of the IHS 100 through the chipset 102. In certain embodiments, chipset 102 may be coupled to a network interface 109, such as provided by a Network Interface Controller (NIC) that is coupled to the IHS 100. In certain embodiments, the network interface 109 may be coupled to the chipset 102 via a PCIe bus. According to various embodiments, network interface 109 may support communication via various wired and/or wireless networks. Chipset 102 may also provide access to one or more hard disk and/or solid state drives 115. In certain embodiments, the chipset 102 may also provide access to one or more optical drives 114 or other removable-media drives. Any or all of the drive devices 114 and 115 may be integral to the IHS 100, or may be located remotely from the IHS 100. In certain embodiments, the chipset 102 may also provide access to one or more Universal Serial Bus (USB) ports 116.

In certain embodiments, the chipset IHS 102 of the IHS 100 may support an I2C (Inter-Integrated Circuit) bus 118 that may be used to communicate with various types of microcontrollers, microprocessor and integrated circuits that are typically integrated components of the motherboard of the IHS 100 and perform specialized functions. In the illustrated embodiment, the I2C bus 118 is utilized by a keyboard controller 118 that is configured to receive keystroke information from an attached keyboard device and provide the detected keystroke information to the operating system of the IHS 100. In certain embodiments, the keyboard controller 118 may utilize different interfaces for communicating with the operating system of the IHS 100. For instance, a keyboard controller 118 may interface with the chipset 102 via a super I/O controller 110 that supports low-bandwidth peripheral devices such as keyboards.

Another resource that may be accessed by processor(s) 101 via chipset 102 is a BIOS (Basic Input/Output System) 117. Upon booting of the IHS 100, processor(s) 101 may utilize BIOS 117 instructions to initialize and test hardware components coupled to the IHS 100 and to load an Operating System (OS) for use by the IHS 100. In certain embodiments, the OS may be configured to enable various different features and functionality of the IHS 100 based on the detected configuration of the IHS 100 as either a tablet or a laptop. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

FIGS. 2a-d are illustrations of a 2-in-1 IHS according to various embodiments, where the 2-in-1 IHS includes a display, such as a touchscreen, and a keyboard base. In each of the four illustrations of FIGS. 2a-d, the 2-in-1 IHS is configured in various arrangements that each provide the user of the 2-in-1 IHS with different capabilities. In certain embodiments, the keyboard base houses the main hardware of the 2-in-1 IHS, such as the motherboard, processor(s), storage drives, memory and the various non-display sub-systems utilized by the 2-in-1 IHS. In other embodiments, in addition to the touchscreen, the display portion of the 2-in-1 IHS houses the main hardware of the 2-in-1 IHS such as the motherboard, processor(s), storage drives, memory and the various sub-systems. In such embodiments, the keyboard portion of the 2-in-1 IHS may include little hardware other than keyboard hardware.

Figure 2A:
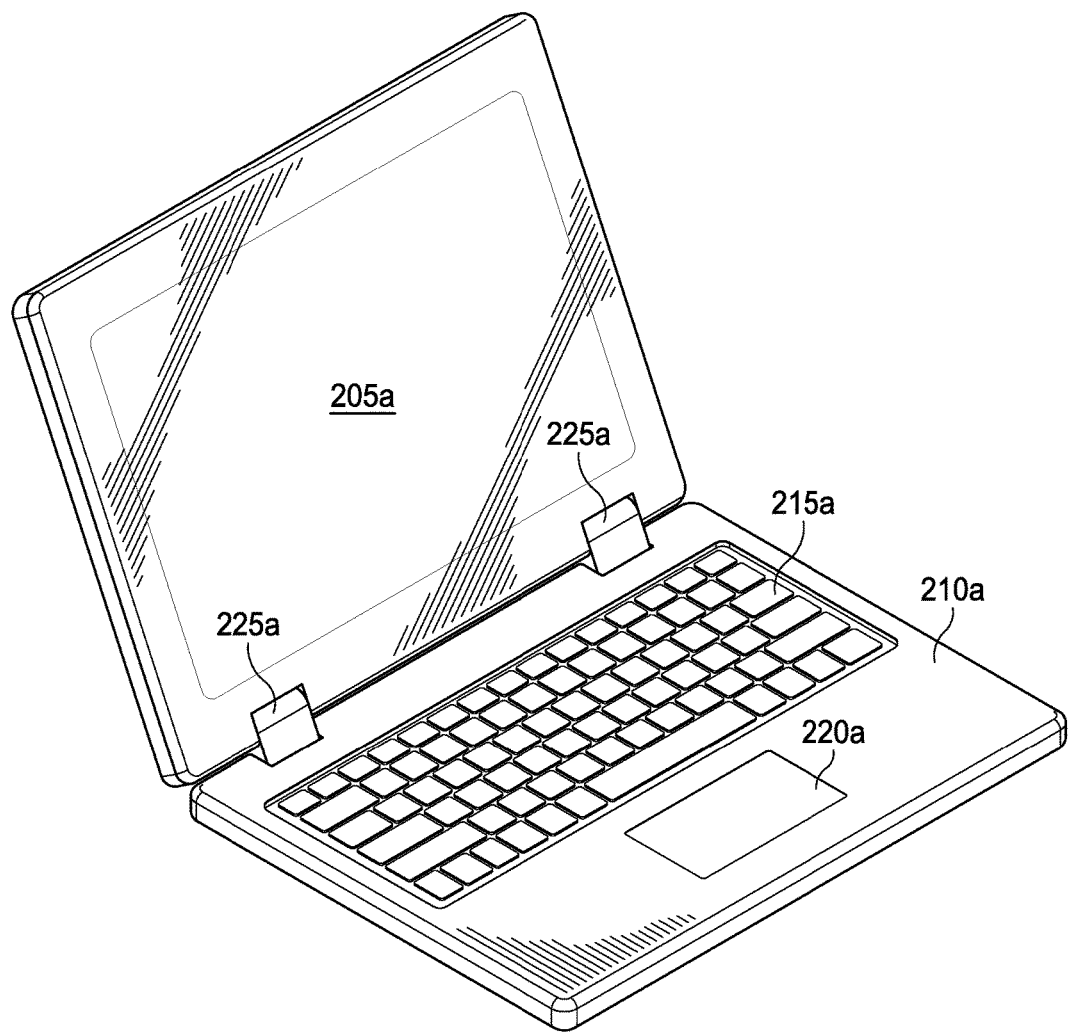
FIG. 2a is an illustration depicting a 2-in-1 IHS positioned in a conventional laptop configuration.

Referring to the configuration of the 2-in-1 IHS of FIG. 2a, the keyboard base 210a may include a set of retractable keys 215a and a touchpad 220a used for accepting finger gesture inputs from the user. In certain embodiments, in addition to accepting finger inputs via the touchscreen display 205a, the 2-in-1 IHS may include a stylus by which the user can provide inputs to the touchscreen display 205a. As illustrated in FIGS. 2a-d, the 2-in-1 IHS allows the touchscreen display 205a to be rotated into various positions relative to the keyboard base 210a, such that the retractable keyboard 215a provided by the base 210a is not utilized and the 2-in-1 IHS may operate similar to a tablet device. As illustrated in FIG. 2a-d, the keyboard base 210a-d and the touchscreen display 205a-d of the 2-in-1 IHS are rotated relative to each other via a pair of hinges 225a-d. Other embodiments may utilize a different number of hinges that couple the keyboard base 210a-d and touchscreen display 205a-d in supporting configurations such as those illustrated in FIGS. 2a-d. Other embodiments may utilize temporary couplings that allow the hinges to be connected and disconnected by the user.

In FIG. 2a, the 2-in-1 IHS rests on the bottom of the keyboard base 210a and the touchscreen display 205a is positioned upright relative to the retractable keyboard 215a, thus configuring the 2-in-1 IHS for use as a laptop computer. In the configuration of FIG. 2a, user input via the keyboard 215a is expected. Consequently, while configured as a laptop, the retractable keyboard 215a of the 2-in-1 IHS remains enabled such that the keycaps of the retractable keyboard 215a are in an extended position and ready for actuation by the user. In certain embodiments, the 2-in-1 IHS may also accept touchscreen finger inputs while the 2-in-1 IHS is configured as a laptop as illustrated in FIG. 2a. In certain of such embodiments, the 2-in-1 IHS may be configured to accept only a limited set of touchscreen finger inputs while configured as a laptop.

Figure 2B:
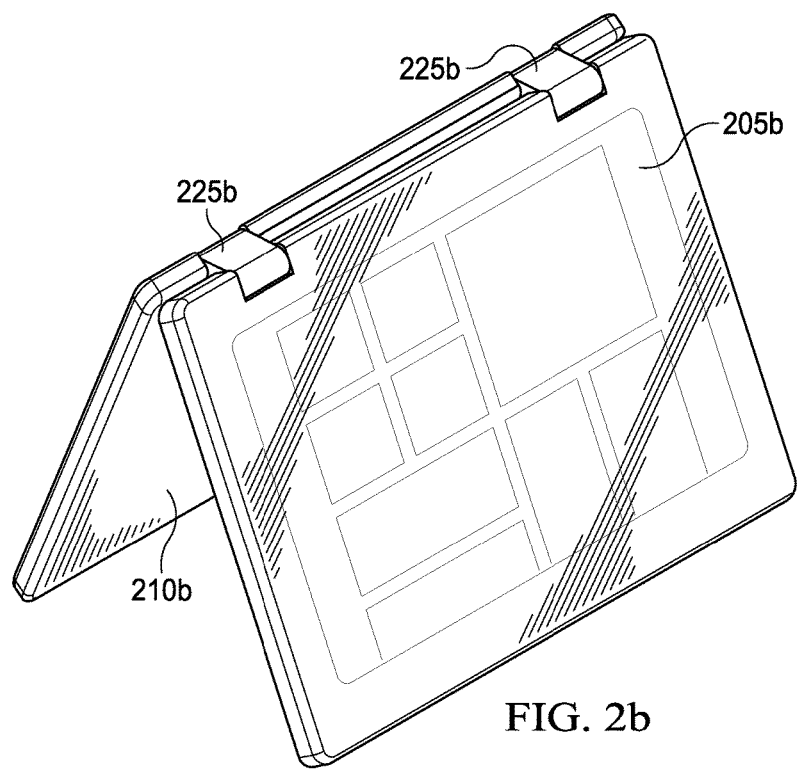
FIG. 2b is an illustration depicting a 2-in-1 IHS positioned in a tent configuration.

In the illustration of FIG. 2b, the 2-in-1 IHS has been configured in what may be referred to as a tent or kickstand configuration. In FIG. 2b, the touchscreen display 205b has been rotated about the hinges 225b away from the keyboard base 210b until the retractable keyboard 215b and the touchscreen display 205b are on opposite, outward facing sides of the tent that is formed by the 2-in-1 IHS in this configuration. Configured in this manner, the 2-in-1 IHS may be stood on a relatively flat surface allowing the user to view the touchscreen display 205a hands free. In the configuration of FIG. 2b, the 2-in-1 IHS may accept finger and/or stylus inputs via the touchscreen display 205a, but the keycaps of the retractable keyboard 215a may be in a retracted position and may be further disabled such that the keycaps cannot be actuated and/or any key inputs are ignored.

Figure 2C:
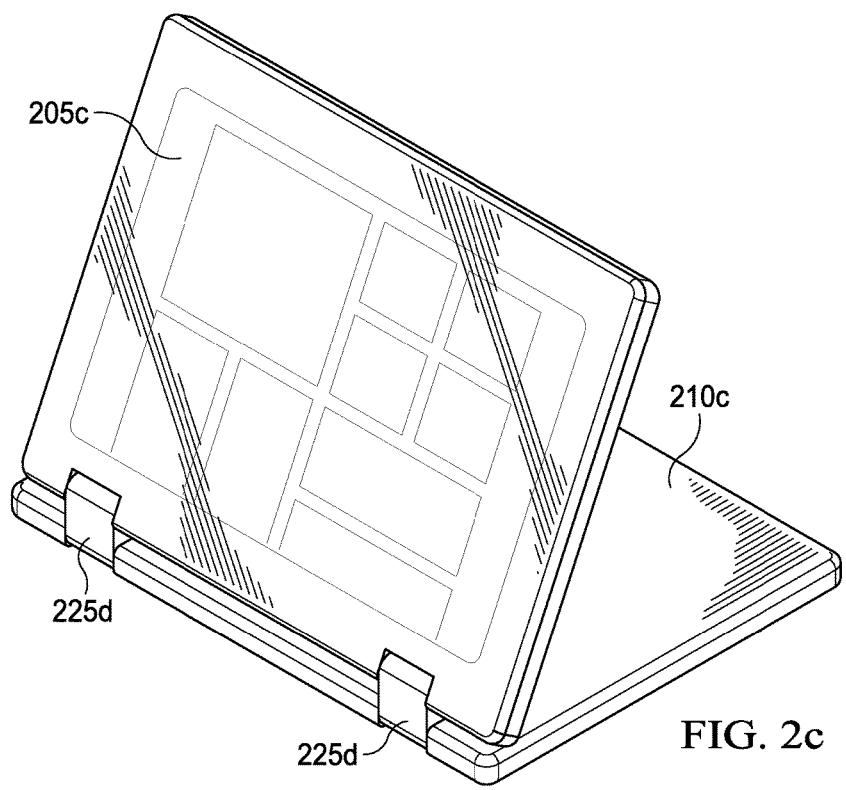
FIG. 2c is an illustration depicting a 2-in-1 IHS positioned in a tablet stand configuration.

In the configuration of FIG. 2c, the 2-in-1 IHS has been flipped into what may be referred to as a tablet stand configuration. The tablet stand configuration of FIG. 2c, may be identical to the tent configuration of FIG. 2b with respect to the rotation of the keyboard base 210c relative to the touchscreen display 205c about the hinges 225c. In the configuration of FIG. 2c, the 2-in-1 IHS rests on the retractable keyboard 215c side of the keyboard base 210c. As with the tent configuration of FIG. 2b, in the tablet stand configuration of FIG. 2c, the keycaps of the retractable keyboard 215c are in a retracted position and may be disabled as inputs to the operating system.

Figure 2D:
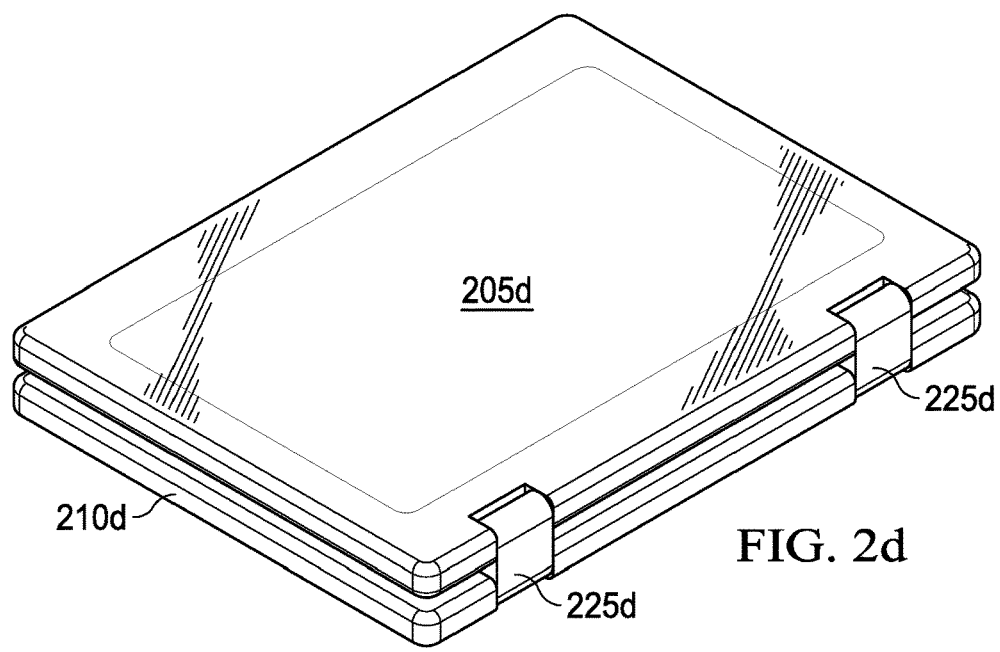
FIG. 2d is an illustration depicting a 2-in-1 IHS in a tablet configuration.

FIG. 2d depicts a tablet configuration of the 2-in-1 IHS. In the illustrated tablet configuration, the keyboard base 210d has been rotated about the hinges 225d until the back of the keyboard base 210d rests against the back of the touchscreen display 205c. In this tablet configuration, the retractable keyboard 215d is exposed on the bottom side of the 2-in-1 IHS opposite the touchscreen display 205d. As with the tent configuration of FIG. 2b, and the tablet stand configuration of FIG. 2c, in the tablet configuration of FIG. 2d, the keycaps of the retractable keyboard are in a retracted position and may be further disabled as inputs to the operating system of the 2-in-1 IHS.

In certain embodiments, the 2-in-1 IHS may also support the retraction of the keys of the retractable keyboard while the 2-in-1 IHS is in what may be referred to as a closed position, in which the touchscreen display is closed over the retractable keyboard and may be latched in this position via mechanical or magnetic latches. In order to limit damage to the touchscreen display when in closed position, an IHS such as a 2-in-1 IHS or a conventional laptop, may maintain a gap between the touchscreen display and the tops of the keycaps, the palm rest, and any other portions of the retractable keyboard. The air gap may protect the display from contact, but adds to the thickness of the IHS in this closed position. In certain embodiments, the retractable keyboard may also be actuated while the 2-in-1 IHS is in a closed position, thus allowing the 2-in-1 to be thinner while in this closed position.

Figure 3B:
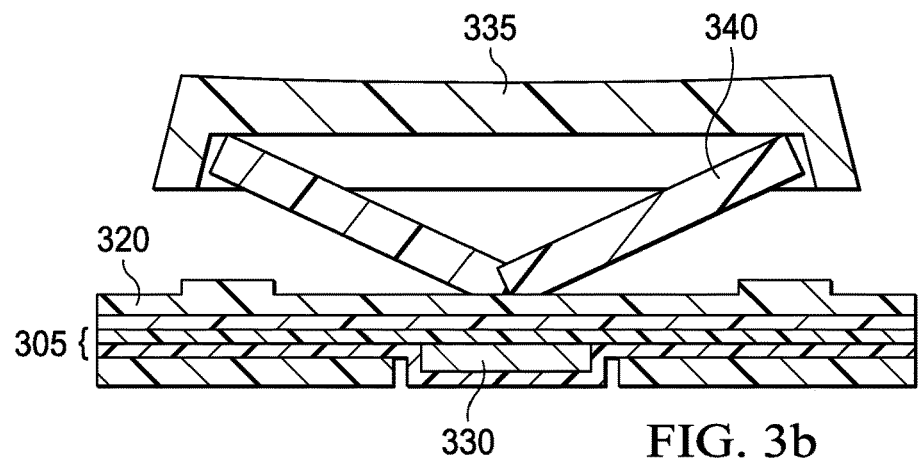
FIG. 3b is an illustration depicting a retractable keycap in a non-retracted position.
Figure 3C:
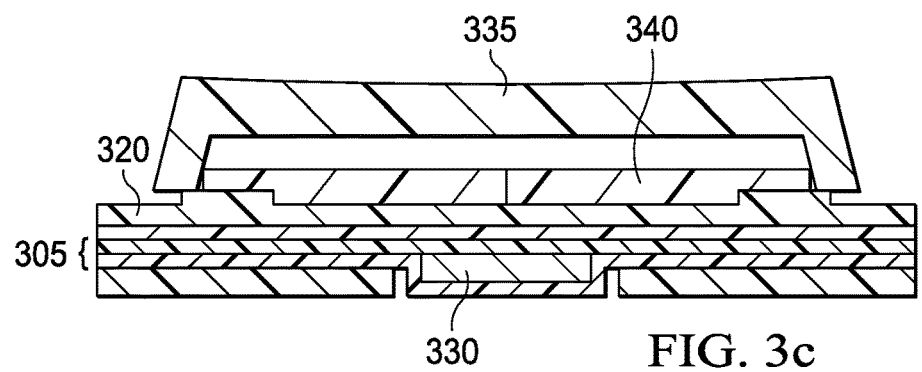
FIG. 3c is an illustration depicting a retractable keycap in a retracted position.
Figure 3A:
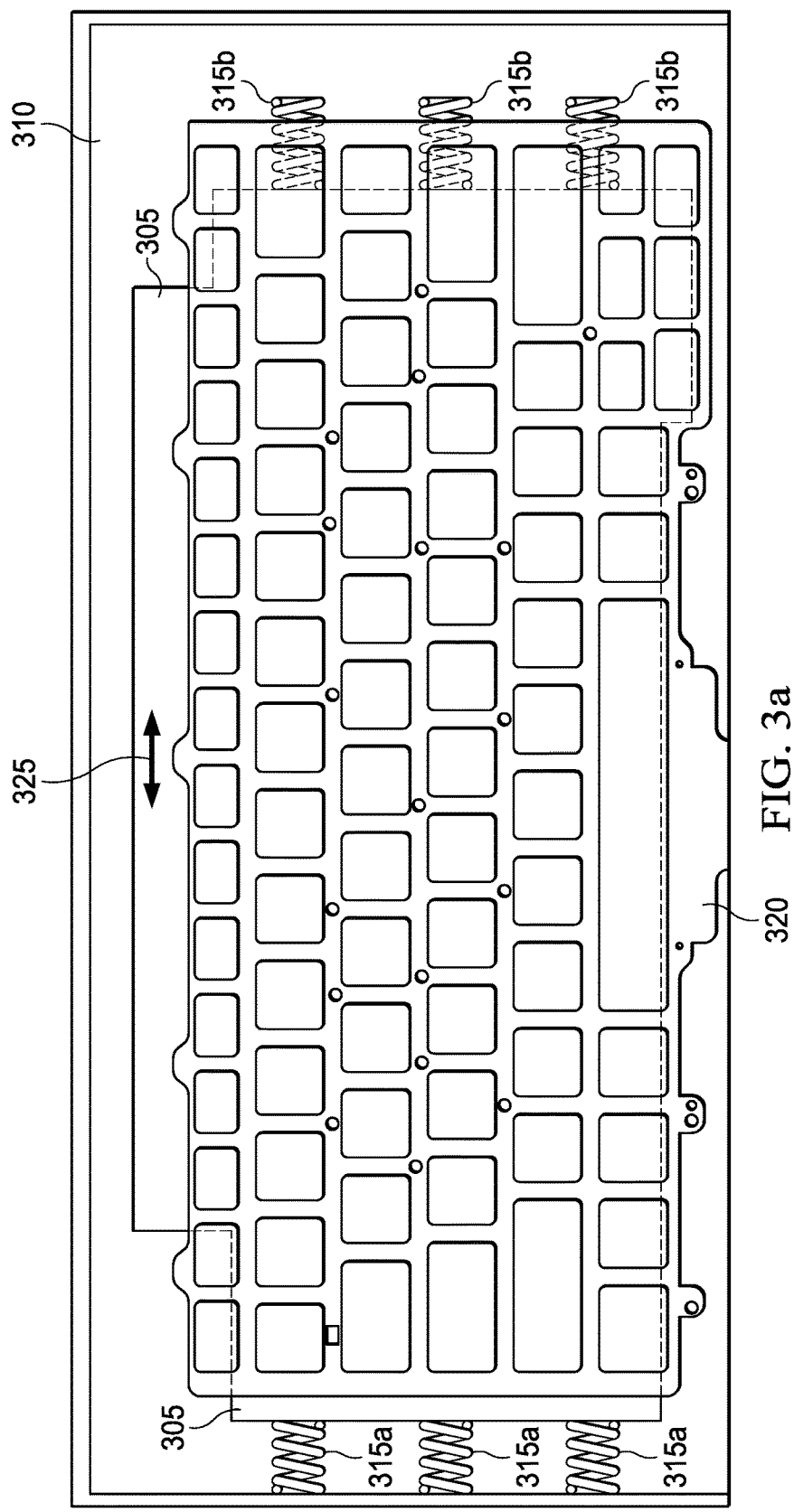
FIG. 3a is an illustration depicting certain components of a retractable keyboard that utilizes a moveable keyboard support plate.

FIG. 3a is an illustration of certain components of a retractable keyboard that operates based on the movement of a keyboard support plate 305. In the retractable keyboard of FIG. 3a, the keyboard support plate 305 is mostly obscured by a plunger sheet 320. In other retractable keyboards, the keyboard support plate 305 may be obscured by the plunger sheet 320 in a different manner than the configuration illustrated in FIG. 3a. The plunger sheet may be constructed of rubber or silicone and include a dome corresponding to each of the individual keys of the retractable keyboard. By depressing a keycap, the corresponding dome of the plunger sheet 320 is collapsed, thus completing a circuit and signaling the actuation of the depressed key.

In the retractable keyboard of FIG. 3a, the retractable keys are actuated via the movement of the keyboard support plate 305 relative to the plunger sheet 320 and the keys. As indicated by arrow 325, the retractable keyboard may be actuated by moving the keyboard support plate 305 along what may be referred to as the x-axis of the retractable keyboard. Other retractable keyboards may be actuated via movement of the keyboard support plate 305 along the y-axis of the keyboard. In certain retractable keyboards, the movement of the keyboard support plate 305, and the resulting actuation of the retractable keycaps, requires sufficient force to overcome the resistive forces of a set of springs 315a-b that attach the keyboard support plate 305 to the keyboard enclosure 310 or other attachment points that are anchored to the keyboard enclosure 310. In once scenario, retracting the keycaps of the retractable keyboard requires moving the keyboard support plate 305 such that springs 315b are stretched while springs 315a are compressed. Releasing the keys and thus enabling the use of the retractable keyboard is aided by the compressive force of stretch springs 315b and controlled by the resistive forces of compressed springs 315a. Other retractable keyboards may employ other configurations of springs to control the movement of the keyboard support plate 305 in other directions, such as along the y-axis of the retractable keyboard.

In order to actuate the keys of the retractable keyboard, the keyboard support plate 305 may include magnets corresponding to each retractable keycaps, where these magnets are embedded or otherwise attached or coupled to the keyboard support plate 305. By displacing the keyboard support plate 305 relative to the keycaps, the embedded magnets are likewise displaced, thus altering magnetic forces exerted on the keys and actuating their movement between retracted and un-retracted positions. One technique that may be used for actuating the retractable keys using magnets embedded in the keyboard support plate 305 is illustrated in FIGS. 3b and 3c.

FIG. 3b is an illustration depicting a retractable keycap 335 that is actuated via the displacement of a keyboard support plate 305 that lies beneath the retractable keys of a retractable keyboard. In FIG. 3b, the keycap 335 is in a non-retracted position and ready to be depressed by a user. The keycap 335 is coupled to the retractable keyboard via a scissor mechanism 340. The scissor mechanism allows the keycap 335 to travel up and down relative to the keyboard in order to support the user depressing the keycaps in entering key entry inputs that are provided to the operating system of the IHS. Accordingly, the scissor mechanism 340 provides at least a portion of the tactile feedback a user feels when depressing the keycap 335 to enter a key entry input and the feel of the keycap 335 returning to the ready position of FIG. 3b.

As illustrated in FIG. 3c, the scissor mechanism 340 allows the keycap 335 to be placed in a retracted position in which the two arms of the illustrated scissor mechanism 340 have been depressed such that they fit within a hollow portion of the keycap 335 and allow the edges of the keycap 335 to rest on a plunger sheet 320 that is used to detect the keycap 335 being depressed. In certain retractable keyboards, the arms of the scissor mechanism 340 are depressed by allowing the point of attachment to the retractable keyboard for each arm to slide within a channel provided by the keyboard base. By also allowing the attachment point of each scissor arm to swivel relative to the keycap 335, the arms of the scissor mechanism 340 may be pushed downward until they each rest on the plunger sheet 320 as showing in FIG. 3c. Other embodiments may utilize different mechanisms other than the illustrated scissor mechanism that similarly allow travel of the keycap to support key entry and allow the keycap to be depressed to a retracted position.

In FIGS. 3b-c, the keyboard support plate 305 is formed from two sheets of rigid materials that allow the keyboard support plate 305 to be displaced along the x-axis and/or the y-axis of the retractable keyboard such that it can slide beneath the keycaps the comprise the retractable keyboard. The two sheets of the keyboard support plate 305 are arranged such that a void is created for a magnet 330 that lies within a channel that extends under the keycap 335 and the scissor mechanism 340. By sliding the keyboard support plate 305 and the magnet 330 within the channel extending beneath the key, the magnetic forces exerted by the magnet 330 on the scissor mechanism can be altered, either allowing the keycap 335 to extend to the un-retracted position of FIG. 3b or securing the keycap in the retracted position of FIG. 3c. By sliding the keyboard support plate 305 so that the magnet 330 lies beneath the keycap 335, the magnet 330 may attract metallic portions of the scissor mechanism such that arms of the scissor mechanism are pulled downwards until they rest against the plunger sheet as showing in FIG. 3c. Sliding the keyboard support plate 305 until the magnet 330 is removed from underneath the keycap 335 serves to release the arms of the scissor mechanism and allows the return mechanism of the key to push the keycap to the ready position of FIG. 3b.

Figure 4:
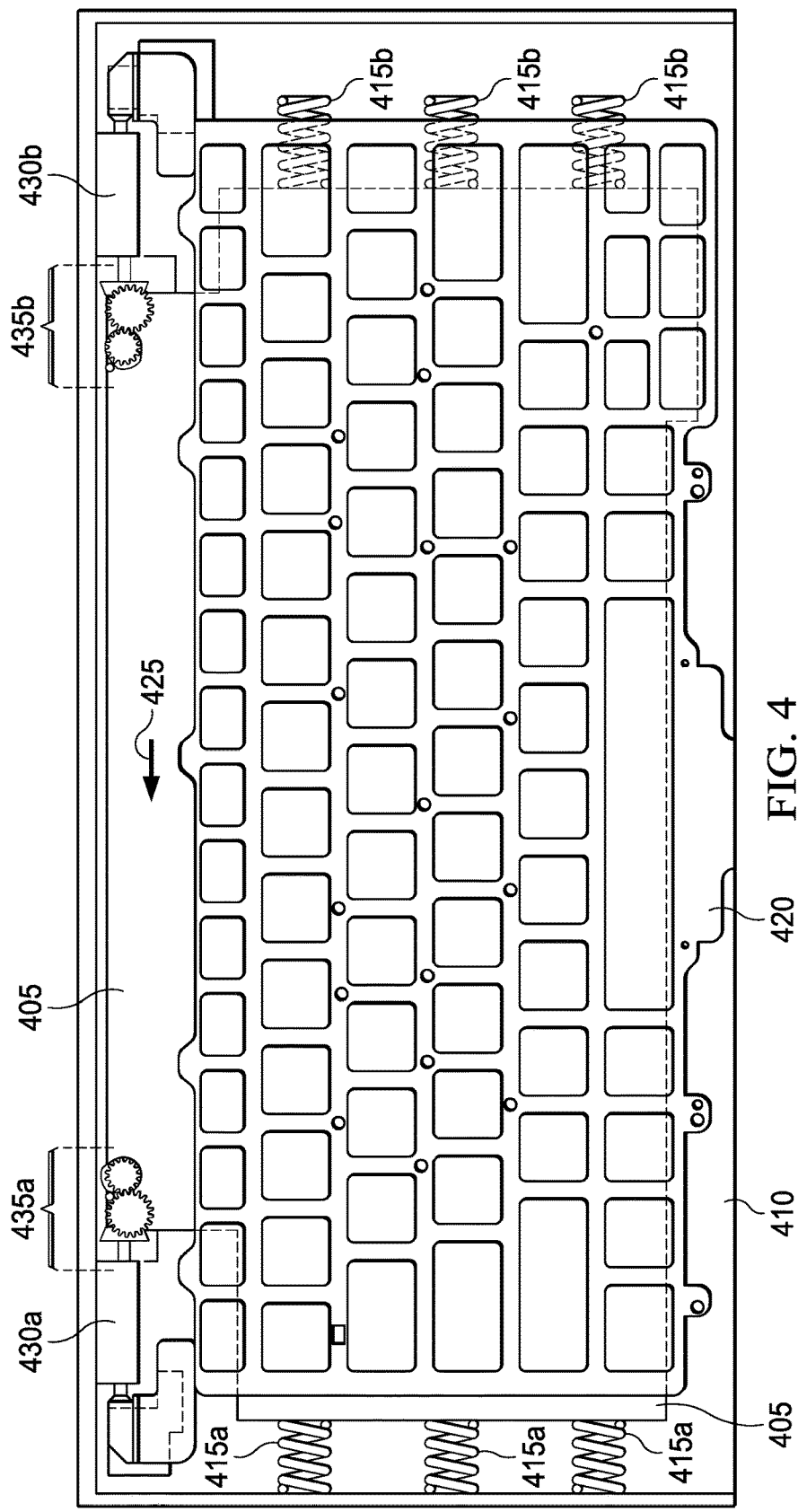
FIG. 4 is an illustration depicting certain components of a mechanism according to certain embodiments using gears and a cam for mechanical actuation of a retractable keyboard based on the rotation of a coupled display device.

FIG. 4 is an illustration depicting certain components of a mechanism according to certain embodiments using gears and a cam for mechanical actuation of the keycaps of a retractable keyboard, where the actuation of the retractable keycaps is based on rotation of a connected display device relative to the retractable keyboard. As described with respect to the embodiment of FIGS. 2a-d, a 2-in-1 IHS may include a keyboard base that is coupled to a touchscreen display via one or more hinges. By rotating the keyboard base and the touchscreen display relative to each other about these hinges, the 2-in-1 IHS can be arranged in various configurations ranging from a laptop to a tablet. In the embodiment of FIG. 4, the enclosure 410 of the keyboard base is connected to a pair of hinges 430a-b that couple the keyboard base to a touchscreen display. By rotating the connected touchscreen display relative to the components of the retractable keyboard illustrated in FIG. 4, the 2-in-1 IHS may be arranged in the configurations such as the four configurations illustrated in FIGS. 2a-d.

As described with respect to the retractable keyboard and retractable keycaps of FIGS. 3a-d, the embodiment of FIG. 4 utilizes the movement of a keyboard support plate 405 to actuate the movement of the individual keycaps to a retracted position. In the embodiment of FIG. 4, the keys are retracted by rotating the attached touchscreen display about the hinges 430a-b, which drives a gear and cam mechanism 435a-b that is coupled to each of the hinges 430a-b. By rotating the touchscreen display about the hinges 430a-b, each gear and cam mechanism 435a-b is configured to displace the keyboard support plate 405 along the x-axis of the retractable keyboard in the direction of arrow 425.

As described with regard to FIG. 3, the keyboard support plate 405 may be attached to the enclosure 410 or other anchored structure of the keyboard base via two sets springs 415a-b. The springs 415a-b are attached to the ends of the keyboard support plate 405 and extend along the x-axis of the retractable keyboard from the keyboard support plate to the attachment points. In the embodiment of FIG. 4, retracting the keycaps via displacement of the keyboard support plate 405 in direction 425 requires stretching springs 415b and compressing springs 415a. When restoring the keycaps to their extended positions, the compression force provided by stretched springs 415b pulls the keyboard support plate 405 to its original position, with this return movement of the keyboard support plate 405 moderated by the resistive force of compressed springs 415a.

In the embodiment of FIG. 4, the force required to stretch springs 415b and displace the keyboard support plate 405 in direction 425 is generated by the rotation of the attached touchscreen display about hinges 430a-b. Each of the gear and cam mechanisms 435a-b is configured to translate the rotation of the touchscreen display hinges 430a-b to an x-axis displacement force on the keyboard support plate 405. The left gear and cam mechanism 435a is configured to translate the rotation of the left hinge 430a to the displacement of the keyboard support plate 405 along the x-axis. The right gear and cam mechanism 435b is likewise configured to translate the rotation of the right hinge 430b to the x-axis displacement of the keyboard support plate 405. As described with respect to FIGS. 5a-b, the gear and cam mechanisms 435a-b are configured to operate together to translate any rotation of the touchscreen display into a force along the x-axis of the retractable keyboard that displaces the keyboard support plate 405 along this x-axis.

Figures 5A, 5B:
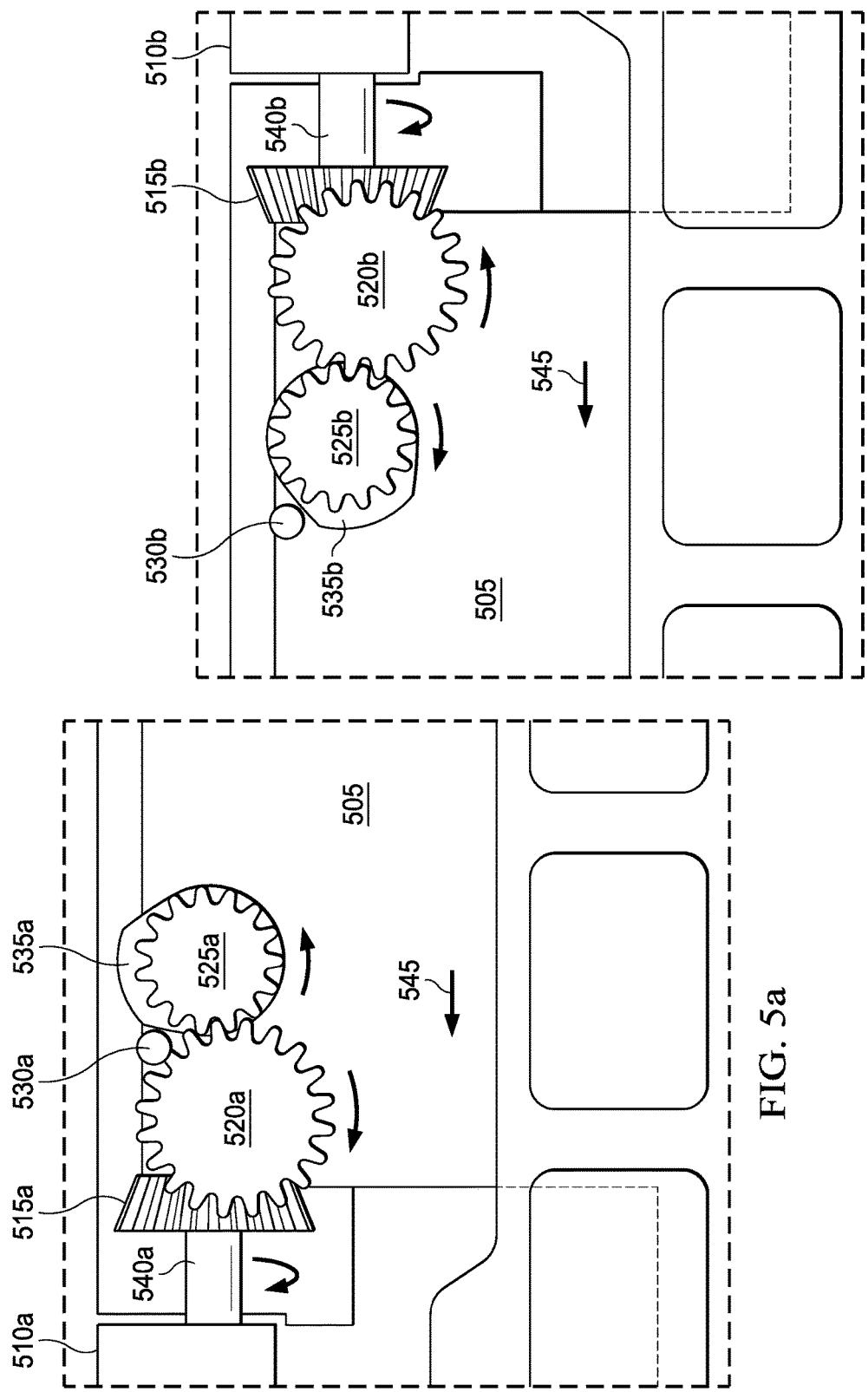
FIG. 5a is an illustration magnifying certain components of the left hinge of the actuation mechanism of FIG. 4.
FIG. 5b is an illustration magnifying certain components of the right hinge of the actuation mechanism of FIG. 4.

FIG. 5a is an illustration that shows a magnified portion of the left hinge actuation mechanism of FIG. 4. More particularly, FIG. 5a illustrates a gear and cam mechanism according to various embodiments that translates the rotation of the touchscreen display about the left hinge 510a to the displacement of the keyboard support plate 505 along the x-axis of the retractable keyboard. The left-side gear and cam mechanism of FIG. 5a includes three gears 515a, 520a, 525a and a cam 535a that drives a follower 530a that may be coupled to or formed from the keyboard support plate 505. This gear and cam mechanism of FIG. 5a translates the rotation of the touchscreen display away from the retractable keyboard side of the base and the resulting rotation of the shaft 540a to the displacement of the keyboard support plate 505 in direction 545 along the x-axis of the retractable keyboard.

The rotation of the touchscreen display about the left hinge 510a results in a corresponding rotation of shaft 540a which is connected to gear 515a along its axis of revolution. In certain embodiments, gear 515a may be a bevel gear that is mated with a corresponding bevel gear 520a to translate the rotation of the hinge shaft 540a about the x-axis of the retractable keyboard to the rotation of the bevel gear 520a about the z-axis of the retractable keyboard. As illustrated in FIG. 5a, bevel gear 520a may be mated with gear 525a in order to translate the rotation of bevel gear 520a to displacement of the keyboard support plate 505 in direction 545. In certain embodiments, gear 525a may be a spur gear or similar gear that is coupled to a cam 535a that exerts a displacement force on the keyboard support plate 505 along the x-axis of the retractable keyboard. In certain embodiments, the cam 535a may be a plate or disc cam that is coupled to gear 525 and is configure to displace force on a follower 530a that moves the keyboard support plate 505 such that the retractable keyboard is moved between retracted and non-retracted modes of operation.

In the embodiment of FIG. 5a, arrows depict the rotation of the shaft 540a and gears 515a, 520a, 525a corresponding to the rotation of the touchscreen display about the hinge 510a away from the retractable keyboard side of the base. In other words, the arrows of FIG. 5a depict the direction of the movement of the keyboard support plate 505 and the rotation of haft 540a and gears 515a, 520a, 525a corresponding to a user opening the touchscreen display of the 2-in-1 IHS from a closed position and rotating the display to the laptop configuration of FIG. 2a and further rotating the display to the successive configurations shows in FIGS. 2b-d, respectively.

When opening the touchscreen display by rotating the hinge 510a, the shaft 540a and the connected bevel gear 515a are rotated in the direction shown, with the bevel gear 515a being rotated clockwise relative to the keyboard support plate 505. The corresponding bevel gears 515a and 520b are mated such that this rotation of bevel gear 515a by shaft 540a results in the clockwise rotation of corresponding bevel gear 520a. As illustrated, the rotation of the bevel gear 520a in the clockwise direction drives gear 525a in the counter-clockwise direction. This rotation of gear 525a also results in the rotation of cam 535a in the counter-clockwise direction. Due to the shape of the cam 535a, the rotation of cam causes a displacement of force on a follower 530a. When cam 535a is rotated counterclockwise by the rotation of gear 525a, as illustrated in FIG. 5a, the cam 535a pushes the follower 530a, and the coupled keyboard support plate 505, in direction 545 along the x-axis of the retractable keyboard, resulting in the retraction and disabling of the keys of the retractable keyboard.

FIG. 5b illustrates a magnified portion of the right hinge actuation mechanism of FIG. 4. More particularly, FIG. 5b illustrates a gear and cam mechanism according to various embodiments that translates the rotation of the touchscreen display about the left hinge 510b to the displacement of the keyboard support plate 505 along the x-axis of the retractable keyboard. As with the left-side gear and cam mechanism of FIG. 5a, the right-side gear and cam mechanism of FIG. 5b also translates the rotation of the touchscreen display away from the retractable keyboard side of the base and the resulting rotation of the shaft 540b to the displacement of the keyboard support plate 505 in direction 545 along the x-axis of the retractable keyboard.

As with the left-side hinge of FIG. 5a, in the embodiment of the right-side hinge of FIG. 5b, arrows depict the rotation of the shaft 540b and gears 515b, 520b, 525b corresponding to the rotation of the touchscreen display about the hinge 510b away from the retractable keyboard side of the base, for instance due to a user opening the touchscreen display of the 2-in-1 IHS from a closed position and rotating the display to the laptop configuration of FIG. 2a and further rotating the display to the successive configurations shows in FIGS. 2b-d, respectively.

When opening the touchscreen display by rotating the hinge 510b, the shaft 540b and the connected bevel gear 515b are rotated in the direction shown, with the bevel gear 515b being rotated counter-clockwise relative to the keyboard support plate 505. The corresponding bevel gears 515b and 520b are mated such that this rotation of the bevel gear 515b by shaft 540b results in the counter-clockwise rotation of corresponding bevel gear 520b. As illustrated, the rotation of the bevel gear 520b in the counter-clockwise direction drives gear 525b in the clockwise direction. Due to the shape of the cam 535b, the rotation of cam causes a displacement of force on a follower 530b. When cam 535b is rotated clockwise by the rotation of gear 525b, as illustrated in FIG. 5b, the cam 535b pushes the follower 530b, and the keyboard support plate 505, in direction 545 along the x-axis of the retractable keyboard, resulting in the retraction and disabling of the keys of the retractable keyboard.

FIGS. 5a-b depict the direction of the rotation and movement of the components of the left and right gear and cam mechanisms when rotating the coupled display device away from retractable keyboard, such as via a user opening a closed 2-in-1 IHS and moving the display to the laptop configuration of FIG. 2a. The embodiments of FIGS. 5a-b operate in reverse in response to the rotation of the display in the opposite direction, such as by closing the display of the 2-in-1 IHS. Accordingly, when rotated in the opposite direction, the gears 515a-b, 520a-b and 525a-b are rotated in the opposite direction of the direction shown in FIGS. 5a-b such that the cams 535a-b are rotated such that the force being exerted on the follower 530a is released and the return springs of the keyboard support plate 505 slides back to its resting position and the keycaps are allowed to travel freely.

In various embodiments, the cams 535a-b and followers 530a-b allow the keycaps of the retractable keyboard to remain in an un-retraced position while the rotation of the display device relative to the retractable keyboard indicating use of the 2-in-1 IHS as a laptop. For instance, in certain embodiments, the cams 535a-b may rotate, as illustrated in FIGS. 5a-b, during the rotation of the hinge 510a-b, but the rotation of the cams 535a-b do not exert a force sufficient to displace the follower until the display device has been rotated past 90 degrees relative to the retractable keyboard. During this portion of the rotation of the display, the keyboard support plate 505 remains in its resting position and the keycaps are ready to receive user key entry inputs. As the display is rotated past 90 degrees from the keyboard base, the cams 535a-b exert a force on the followers 530a-b, thus displacing the keyboard support plate 505. During this interval of the rotation, the keycaps are in the transition between their un-retracted position and their retracted positions. In certain embodiments, all key entry inputs may be ignored during this transition period of the retractable keycaps. In certain embodiments, this transition interval may occur while the display is rotated between 90 and 180 degrees relative to the retractable keyboard. When the display device is rotated past 180 degrees from the display, for instance configuring the 2-in-1 IHS into the tablet mode of FIG. 2d, the cams 535a-b may maintain a constant force on the followers during this rotation interval, thus keeping the keyboard support plate 505 in a displaced position and keeping the keycaps in their retracted positions.

Figure 6:
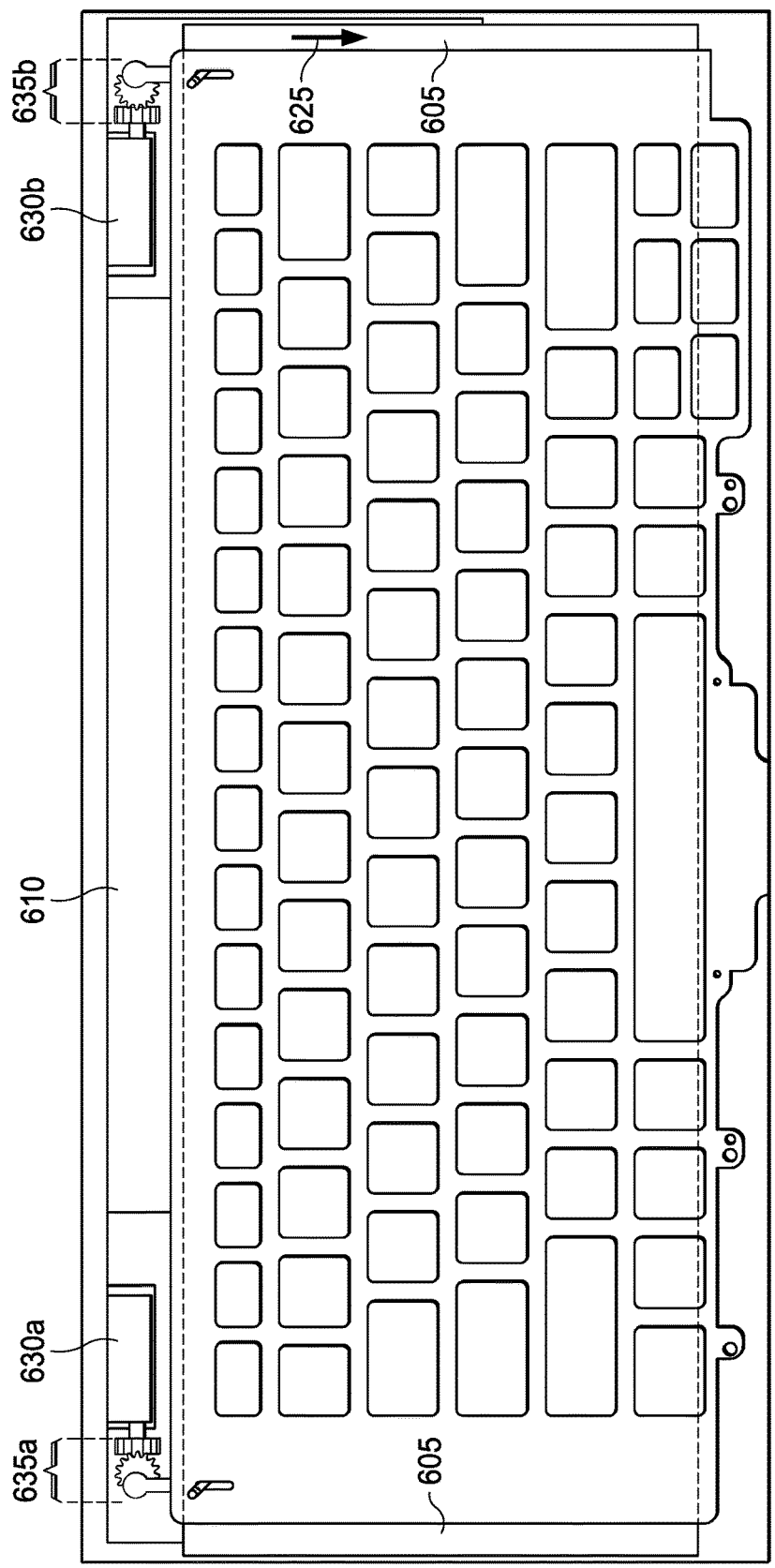
FIG. 6 is an illustration depicting certain components of a mechanism according to certain embodiments using gears and a crank for mechanical actuation of a retractable keyboard based on the rotation of a coupled display device.

FIG. 6 is an illustration depicting certain components of a mechanism according to certain embodiments using gears and a crank for mechanical actuation of the keys of a retractable keyboard based on the rotation of a coupled display device. Similar to the embodiment of FIG. 4, in the embodiment of FIG. 6, the enclosure 610 of the keyboard base is connected to a pair of hinges 630a-b that are coupled to a connected touchscreen display. By rotating a connected touchscreen display about the hinges 630a-b relative to the components of the retractable keyboard illustrated in FIG. 6, the 2-in-1 IHS may be arranged in the configurations such as the four configurations illustrated in FIGS. 2a-d.

As with the embodiment of FIG. 4, the gear and crank mechanism of FIG. 6 utilizes the movement of a keyboard support plate 605 to actuate the retraction and extension of the individual keys of the retractable keyboard. Rotating the attached touchscreen display about the hinges 630a-b serves to drive a gear and cam mechanism 635a-b that is coupled to each of the hinges 630a-b. By rotating the touchscreen display about the hinges 630a-b, each gear and crank mechanism 635a-b is configured to displace the keyboard support plate 605 along the y-axis of the retractable keyboard in the direction of arrow 625. In such embodiments that displace the keyboard support plate 605 along the y-axis, the keycap retraction mechanism, such as the scissor mechanism described with respect to FIGS. 3a-b, may utilize different orientations and placements of the magnets and/or retraction mechanisms to translate y-axis displacement of the keyboard support place to the individual keycaps. Although not shown in FIG. 6, embodiments may utilize sets of springs, similar to the springs described with respect to the embodiment of FIG. 4, that serve to pull the keyboard support plate back to its resting position and to otherwise service to moderate and control the movement of the keyboard support plate as it is displaced via the rotation of the hinges.

Similar to the gear and cam mechanisms described with respect to FIGS. 4 and 5a-b, each of the gear and crank mechanisms 635a-b is configured to translate the rotation of the touchscreen display hinges 630a-b to a y-axis displacement force on the keyboard support plate 605. The left gear and cam mechanism 635a is configured to translate the rotation of the left hinge 630a to the displacement of the keyboard support plate 605 along the y-axis of the retractable keyboard. The right gear and crank mechanism 435b is likewise configured to translate the rotation of the right hinge 630b to the y-axis displacement of the keyboard support plate 605. As described with respect to FIGS. 7a-b, the gear and crank mechanisms 635a-b are configured to operate together to translate any rotation of the touchscreen display into a force along the y-axis of the retractable keyboard that displaces the keyboard support plate 605 along this y-axis.

Figures 7A, 7B:
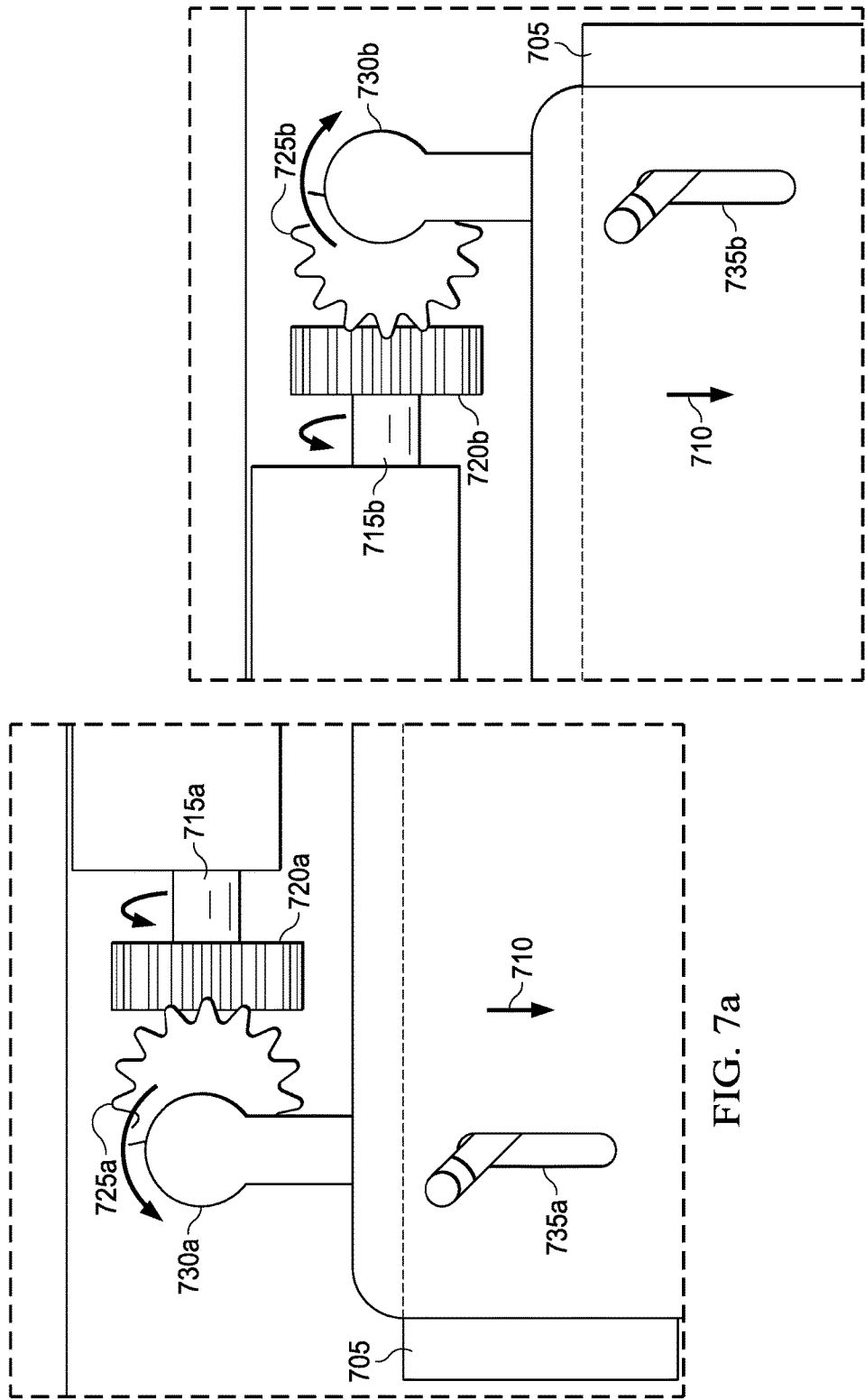
FIG. 7a is an illustration magnifying certain components of the left hinge of the actuation mechanism of FIG. 6.
FIG. 7b is an illustration magnifying certain components of the right hinge of the actuation mechanism of FIG. 6.

FIG. 7a is an illustration that shows a magnified portion of the left hinge actuation mechanism of FIG. 6. More particularly, FIG. 7a illustrates a gear and crank mechanism according to various embodiments that translates the rotation of the touchscreen display about the left hinge to the displacement of the keyboard support plate 705 along the y-axis of the retractable keyboard. The left-side gear and crank mechanism of FIG. 7a includes two gears 720a, 725a and a crank 730a that drives a coupling 735a to the keyboard support plate 505. This gear and crank mechanism of FIG. 7a translates the rotation of the touchscreen display away from the retractable keyboard side of the base and the resulting rotation of the shaft 715a to the displacement of the keyboard support plate 705 in direction 710 along the y-axis of the retractable keyboard.

The rotation of the touchscreen display about the left hinge results in a corresponding rotation of shaft 715a which is connected to gear 720a along its axis of revolution. In certain embodiments, gear 720a may be a spur gear that is mated with a corresponding spur gear 725a to translate the rotation of the hinge shaft 715a about the x-axis of the retractable keyboard to the rotation of gear 725a about the z-axis of the retractable keyboard. In certain embodiments, gears 720a and 725a may be a corresponding pair of bevel gears. As illustrated in FIG. 7a, gear 725a may be mated with gear 720a in order to translate the rotation of the shaft 715a to the displacement of a crank 730 coupled to gear 725a, resulting in the displacement of the keyboard support plate 715 in direction 710, along the y-axis the retractable keyboard.

In certain embodiments, the crank 730a may be an arm or other form of connecting rod that is coupled to gear 725a and is configure to displace a force on the keyboard support plate 715 such that the retractable keyboard is moved between retracted and non-retracted modes of operation. In the embodiment of FIG. 7a, the coupling between the crank 730a and the keyboard support plate 715 is illustrated by a pin that connects the crank 730a to the keyboard support plate 715 and travels along a channel in the keyboard plunger sheet as the keyboard support plate 715 is displaced. Other embodiments may utilize other forms of coupling the crank 730a to the keyboard support plate 715.

In the embodiment of FIG. 7a, arrows depict the rotation of the shaft 715a and gears 720a, 725a and movement of the crank 730a corresponding to the rotation of the touchscreen display about the hinge away from the retractable keyboard side of the base, for instance due to a user opening the touchscreen display of the 2-in-1 IHS from a closed position and rotating the display to the laptop configuration of FIG. 2a and further rotating the display to the successive configurations shows in FIGS. 2b-d, respectively.

When opening the touchscreen display by rotating the left hinge, the shaft 715a and the connected gear 720a are rotated in the direction shown, with the gear 720a being rotated clockwise relative to the hinge. The corresponding gears 720a and 725b are mated such that this rotation of gear 720a by shaft 715a results in the counter-clockwise rotation of corresponding gear 725a. As illustrated, the rotation of gear 725a in the clockwise direction drives the crankshaft along the y-axis of the retractable keyboard. As illustrated in FIG. 7a, rotation of gear 730a in the counter-clockwise direction may pushes the crank 730a and the coupled keyboard support plate 705, in direction 710 along the y-axis of the retractable keyboard, resulting in the retraction and disabling of the keys of the retractable keyboard.

FIG. 7b illustrates a magnified portion of the right hinge actuation mechanism of FIG. 6. More particularly, FIG. 7b illustrates a gear and crank mechanism according to various embodiments that translates the rotation of the touchscreen display about the right hinge to the displacement of the keyboard support plate 705 along the y-axis of the retractable keyboard. As with the left-side gear and crank mechanism of FIG. 7a, the right-side gear and crank mechanism of FIG. 7b also translates the rotation of the touchscreen display away from the retractable keyboard side of the base and the resulting rotation of the shaft 715b to the displacement of the keyboard support plate 715 in direction 710 along the y-axis of the retractable keyboard.

As with the left-side hinge of FIG. 7a, in the embodiment of the right-side hinge of FIG. 7b, arrows depict the rotation of the shaft 715b and gears 720b, 725b and the movement of crank 730b corresponding to the rotation of the touchscreen display about the hinge away from the retractable keyboard side of the base, for instance due to a user opening the touchscreen display of the 2-in-1 IHS from a closed position and rotating the display to the laptop configuration of FIG. 2a and further rotating the display to the successive configurations shows in FIGS. 2b-d, respectively.

When opening the touchscreen display by rotating the hinge, the shaft 715b and the connected gear 720b are rotated in the direction shown, with the gear 720b being rotated counter-clockwise relative to the hinge. The corresponding gears 720b and 725b are mated such that this rotation of the gear 720*b* by shaft 715*b* results in the clockwise rotation of corresponding gear 715*b*. As illustrated, the rotation of gear 725*b* in the clockwise direction drives the crankshaft along the y-axis of the retractable keyboard. As illustrated in FIG. 7*b*, rotation of gear 725*b* in the clockwise direction may push crank 730*b* and the coupled keyboard support plate 705, in direction 710 along the y-axis of the retractable keyboard, resulting in the retraction and disabling of the keys of the retractable keyboard.

FIGS. 7*a*-*b* depict the direction of the rotation and movement of the components of the left and right gear and crank mechanisms when rotating the coupled display device away from retractable keyboard, such as via a user opening a closed 2-in-1 IHS and moving the display to the laptop configuration of FIG. 2*a*. The embodiments of FIGS. 7*a*-*b* operate in reverse in response to the rotation of the display in the opposite direction, such as by closing the display of the 2-in-1 IHS. Accordingly, when rotated in the opposite direction, the gears 720*a*-*b* and 725*a*-*b* are rotated in the opposite direction of the direction shown in FIGS. 7*a*-*b* such that the crank 730*a*-*b* moves in the opposite of direction 710 and a displacement force moves the keyboard support plate 705 back to its original position.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System), comprising: a keyboard device comprising a plurality of retractable key caps, wherein: (i) in a first mode, the plurality of retractable key caps are in extended positions, and (ii) in a second mode, the plurality of retractable key caps are in retracted positions; and a display device coupled to the keyboard device, wherein a coupling allows the display device to be rotated around an edge of the keyboard device, wherein the keyboard device has a rectangular shape with a long side and a short side, wherein the edge is disposed along the long side, wherein the keyboard device is configured to switch from the first mode to the second mode based on the rotation, and wherein the switching comprises a displacement of a keyboard support plate relative to the plurality of retractable key caps, in a direction parallel to the edge, wherein the display device and the keyboard device are coupled via one or more hinges, and wherein rotating of the one or more hinges causes a gear mechanism to switch the keyboard device from the first mode to the second mode.

2. The IHS of claim 1, wherein the gear mechanism drives a cam that exerts a displacement force on the keyboard support plate.

3. The IHS of claim 2, wherein the cam exerts the displacement force on the keyboard support plate by displacing a force on a follower coupled to the keyboard support plate.

4. The IHS of claim 1, wherein the gear mechanism drives a crank that exerts a displacement force on the keyboard support plate.

5. The IHS of claim 4, the crank exerts the displacement force on the keyboard support plate by displacing a force on a pin used to couple the keyboard support plate to the crank.

6. The IHS of claim 5, wherein the movement of the pin is restricted by a channel.

7. A keyboard device, comprising: a plurality of retractable key caps, wherein: (i) in a first mode, the plurality of retractable key caps are in extended positions, and (ii) in a second mode, the plurality of retractable key caps are in retracted positions; and a coupling to a display device, wherein the coupling allows the display device to be rotated around an edge of the keyboard device, wherein the keyboard device has a rectangular shape with a long side and a short side, wherein the edge is disposed along the long side, wherein the keyboard device is configured to switch from the first mode to the second mode based on the rotation of the coupling, and wherein the rotation causes a displacement of a keyboard support plate relative to the plurality of retractable key caps, in a direction parallel to the edge, wherein the keyboard device is configured to switch from the first mode to the second mode via a displacement force generated by a gear mechanism on the keyboard support plate.

8. The keyboard device of claim 7, wherein the coupling comprises one or more hinges connecting the display device and the keyboard device.

9. The keyboard device of claim 8, further comprising: the gear mechanism configured to translate the rotation of the coupling to a force that causes the keyboard device to switch from the first mode to the second mode.

10. The keyboard device of claim 7, wherein the gear mechanism drives a cam that exerts the displacement force on the keyboard support plate.

11. The keyboard device of claim 10, wherein the cam exerts the displacement force on the keyboard support plate by displacing a force on a follower coupled to the keyboard support plate.

12. The keyboard device of claim 7, wherein the gear mechanism drives a crank that exerts the displacement force on the keyboard support plate.

13. The keyboard device of claim 12, wherein the crank exerts the displacement force on the keyboard support plate by displacing a force on a pin used to couple the keyboard support plate to the crank.

14. The keyboard device of claim 13, wherein the movement of the pin is restricted by a channel.

15. A method, comprising: driving a plurality of retractable key caps comprising a retractable keyboard device coupled to a display device via a coupling that allows the display device to be rotated around an edge of the retractable keyboard device, wherein the retractable keyboard device has a rectangular shape with a long side and a short side, and wherein the edge is disposed along the long side; and translating the rotation of the coupling to a force that switches the plurality of retractable keys from a first mode to a second mode, wherein in the first mode, the plurality of retractable key caps are in extended positions, and in the second mode, the plurality of retractable key caps are in retracted positions and wherein the rotation causes a displacement of a keyboard support plate relative to the plurality of retractable key caps, in a direction parallel to the edge, wherein the translation utilizes a gear mechanism that transfers the force to a displacement of the keyboard support plate, and wherein the displacement switches the retractable keys from the first mode to the second mode.

* * * * *